March 28, 1939. J. L. BARR 2,151,828
PARKING DEVICE FOR AUTOMOBILES
Original Filed Aug. 20, 1932   3 Sheets-Sheet 1
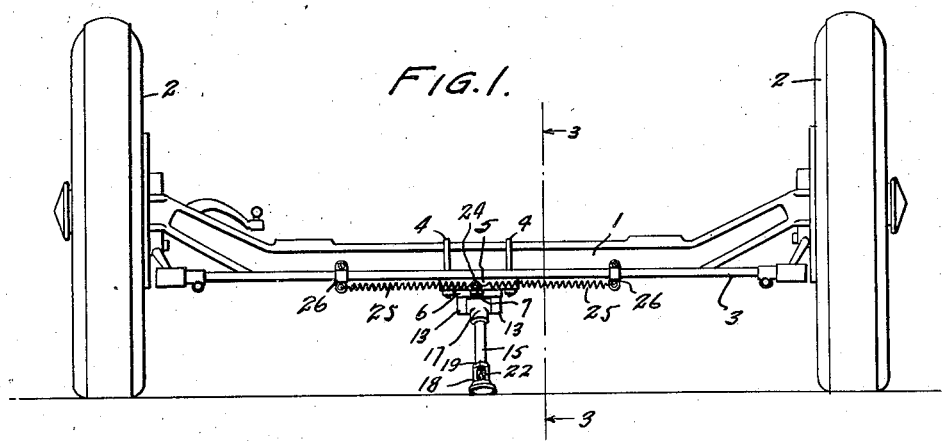
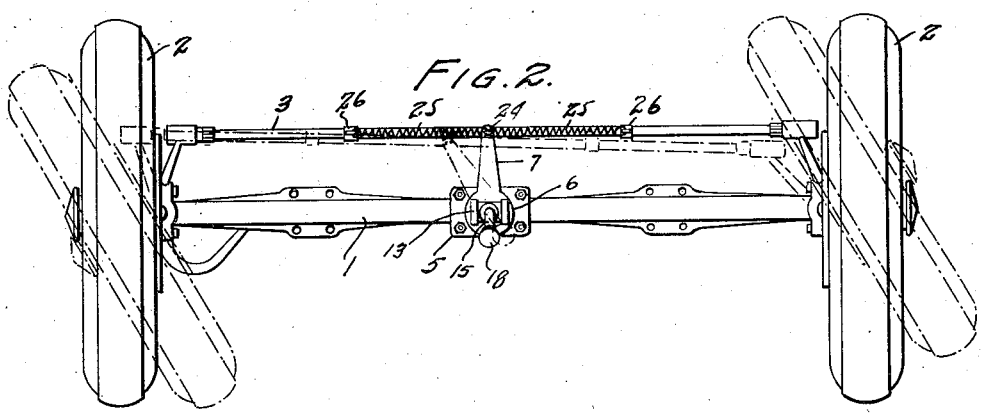
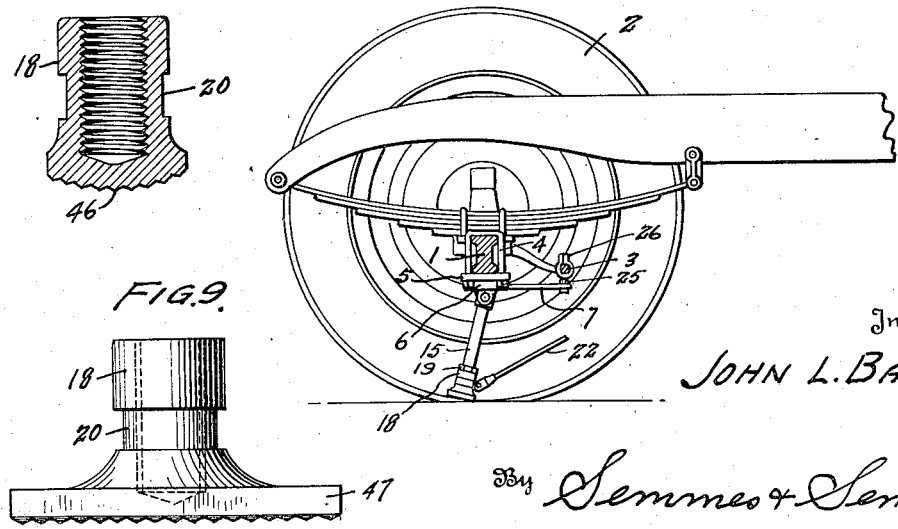
Inventor
JOHN L. BARR
By Semmes & Semmes
Attorneys March 28, 1939. J. L. BARR 2,151,828
PARKING DEVICE FOR AUTOMOBILES
Original Filed Aug. 20, 1932 3 Sheets-Sheet 2
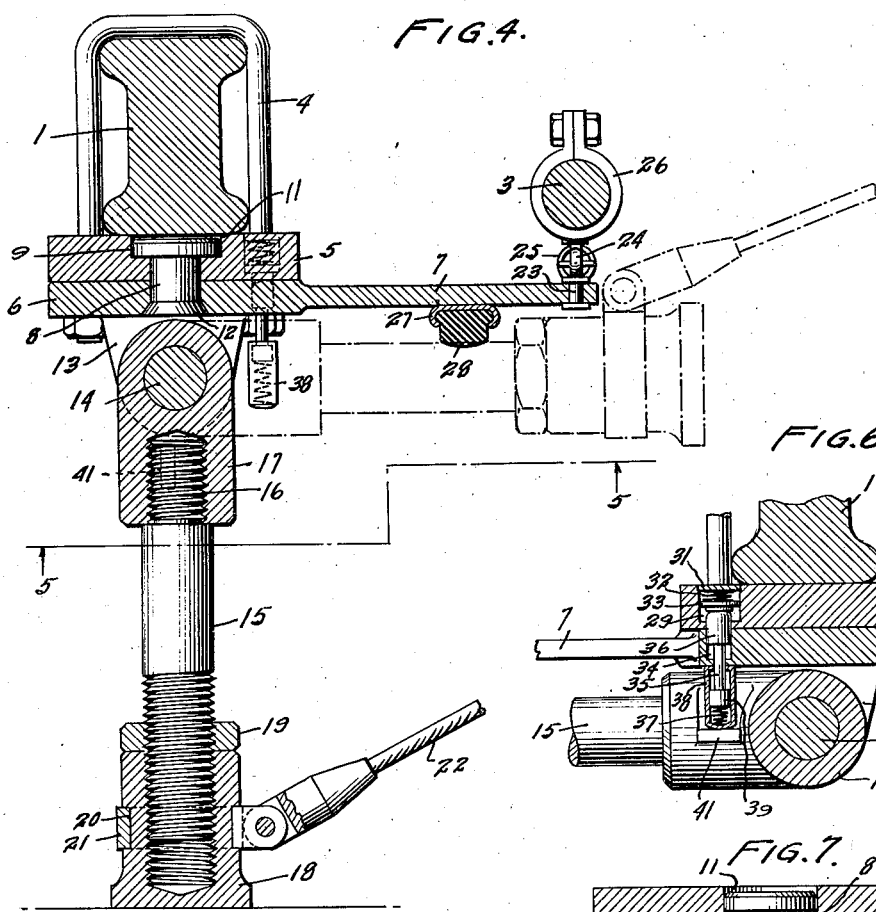
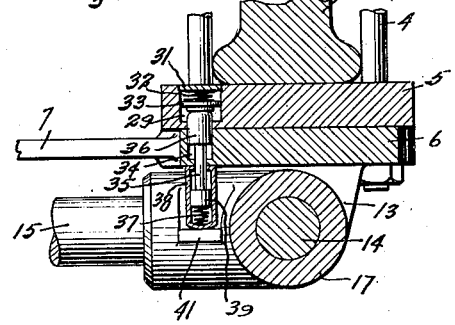
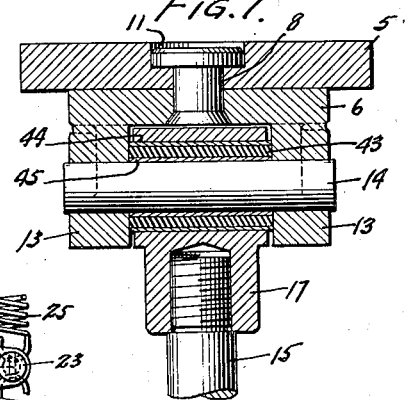
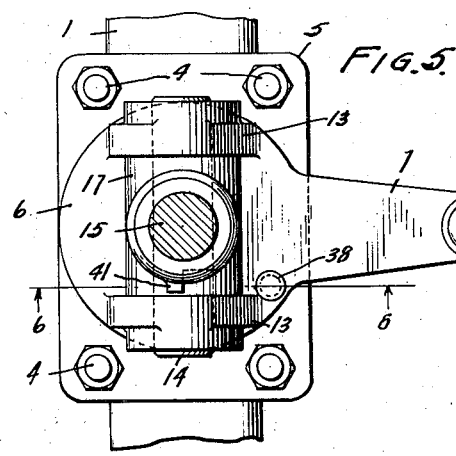
Inventor
JOHN L. BARR
By Semmes & Semmes
Attorneys

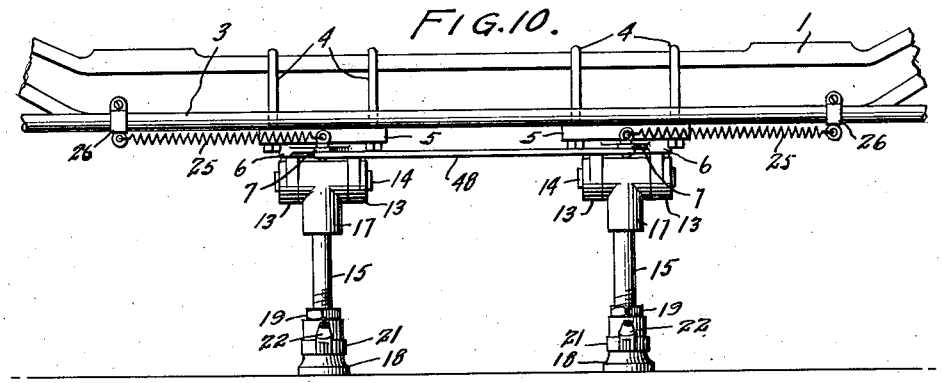
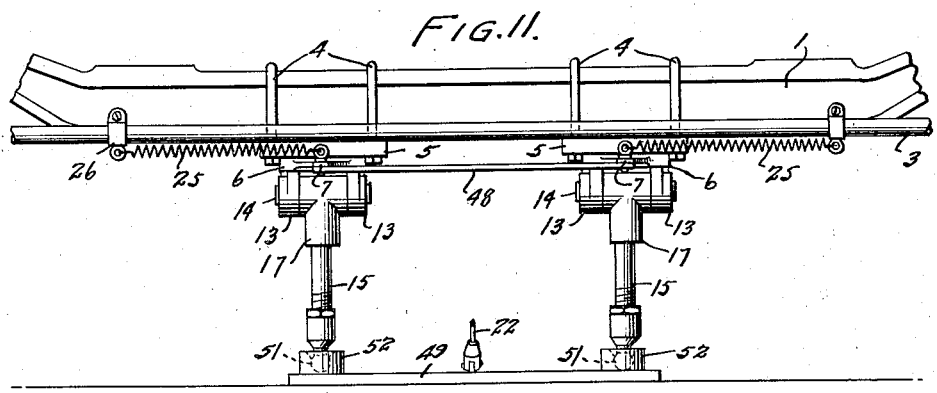

Patented Mar. 28, 1939

2,151,828

UNITED STATES PATENT OFFICE 2,151,828

PARKING DEVICE FOR AUTOMOBILES

John L. Barr, Chevy Chase, Md.

Original application August 20, 1932, Serial No. 629,691. Divided and this application April 14, 1936, Serial No. 74,385. Renewed August 17, 1938.

8 Claims. (Cl. 280—150)

This application is a division of my copending application Serial No. 629,691, filed August 20, 1932.

An object of this invention is to minimize the danger of injury both to the elevating device and to the roadbed through twisting strains which may be imposed upon the device due to inequalities in the roadbed, cramp of the steering wheels and other like factors.

Another object of my invention is to provide a simple construction that is easily and cheaply made and will always be available for instant operation when it is necessary to turn the car on a short radius.

A still further object of my invention is to provide a device which will permit turning of the car on a short radius with a minimum of effort, and yet which has no harmful effect on the normal steering of the vehicle when the device itself is not in operation.

With these and other objects in view which may be incident to my improvements, the invention consists in the parts and combinations to be hereinafter set forth and claimed, with the understanding that the several necessary elements comprising my invention may be varied in construction, proportions and arrangement, without departing from the spirit and scope of the appended claims.

In order to make my invention more clearly understood, I have shown in the acompanying drawings means for carrying the same into practical effect, without limiting the improvements in their useful applications to the particular constructions which, for the purpose of explanation, have been made the subject of illustration.

In the drawings:

Figure 1 is an elevation, looking from the rear of the car towards the front, of the front steering wheels of the car with my elevating device attached in place.

Figure 2 is a bottom plan view of the construction shown in Figure 1, with part of the details omitted.

Figure 3 is a view taken on the line 3—3 of Figure 1, looking in the direction of the arrows.

Figure 4 is a view partly in cross section of the details of construction of my elevating device, showing in dotted lines the device raised to the inoperative position.

Figure 5 is a view taken on the line 5—5 of Figure 4, looking in the direction of the arrows.

Figure 6 is a view taken on the line 6—6 of Figure 5, looking in the direction of the arrows.

Figure 7 is a cross sectional view of a modification of the joint between the elevating device and the car.

Figure 8 is a detail in cross section of a modified form of ground engaging member for the elevating device.

Figure 9 is a front elevation of a modified form of ground engaging device for the elevating member.

Figure 10 is a rear elevation of another form of elevating device.

Figure 11 is a rear elevation of another modification.

Referring to the drawings, and particularly to the form of my device shown in Figures 1 to 6 inclusive, I have shown a steering axle of an automobile, which is normally the front axle, designated by the numeral 1. Mounted on this front axle are steering wheels 2, shown in a cramped position in dotted lines in Figure 2. In order to steer the wheels, proper connections such as are usual in constructions of this character are made, which include a steering tie rod 3.

Fastened by suitable U-clamps 4 to the under side of the front axle is an elevating mechanism comprising a support plate 5, which acts as one-half of a swivel joint, the other half of which is a swivel plate 6 having an arm 7 integrally formed therewith. The support plate 5 and the swivel plate 6, which is in sliding contact therewith, are mounted so that the plate 6 can swivel on the plate 5.

There is a stud 8, as plainly shown in Figure 4, whose upper end is provided with a head 9 which fits in the recess 11 of the support plate 5. The lower end of the stud 8 may be provided with a flanged portion 12 which is suitably attached by any known means to the stud 8, and which permits the swivel plate 6 to rotate on the support plate 5. The swivel plate 6 is provided with two downwardly extending trunnion blocks 13 which holds the ends of a stub axle 14.

Mounted to swing on the stub axle 14 is an elevating rod 15 which is screwed, at 16, into a bearing member 17 which swivels on the stub axle 14. At the lower end of the elevating rod 15, I have provided a foot construction comprising a foot member 18 into which is screwed the rod 15. A lock nut 19 is then screwed into position to hold the rod 15 in the foot member 18 at the desired position. This construction permits the rod 15 to have any desired operative length to accommodate for various sizes of cars.

The foot member 18 is made with an annular recess 20 around which is bolted a collar 21 to which is attached, by suitable connections, a cable 22 so that upon pulling the cable the elevating rod 15 and the accompanying mechanism may be drawn up into the position shown in dotted lines in Figure 4.

The rod 15 may be, in operation, let down, and may swing on either side of the vertical. The driver, for instance in the position shown in Figure 3, drives the car forward to raise the front end sufficiently to relieve the weight on the front wheels to permit them to be readily turned. If the elevating rod 15, however, was on the other side of the vertical, he would back the car on to the rod so that the wheels could be readily turned. This general form of operation is shown in my Patent Nos. 1,967,219; 1,954,308; Re. 19,247; 1,963,879; and 1,969,198. It gives a flexibility of operation not inherent in the other devices. There is no danger of injuring the elevating rod because there is no stop against which the momentum of the car can deal a damaging impact.

The device is merely allowed to fall into engagement with the roadbed, and if the driver fails to mount upon the device at the exact position he wants, and should drive over it, for instance by backing the car, he can can come forward a few inches and mount it again. It will be understood that the control is applied through the power of the car and through the control of the foot brakes. It is an easy operation to drive up on the device and hold the car by means of the brakes in the desired position while the front wheels are turned. All this has been explained in my applications which issued into the patents listed above.

In the construction shown in the drawings, the arm 7 is provided near its end with a support piece 23 carrying an upstanding eyelet member 24 to which are attached springs 25, the springs 25 at their other ends being attached to support pieces 26 mounted on the steering tie rod 3.

The arrangement is such that through the arm 7 and the spring connections with the tie rod, the elevating rod 15 is swiveled on the swivel joint comprising the support plate 5 and swivel plate 6, so that when the rod 15 swings either forward or to the rear of the vertical on the stub axle 14, the plane of swing of the member 15 will be substantially in line with a plane passing through the wheels. This is plainly shown in Figure 2, which shows the wheels cramped and the rod 7 in dotted lines having been carried to one side. The plane of swing of the rod 15 will be substantially parallel to the cramped position of the wheels.

In order to permit the device to be held in its upper inoperative position, as shown in Figure 4, without danger of rattling or of injuring the device, or the car structure, I have shown on the bottom of the arm 7 a holding clamp 27 on which is mounted a rubber bumper 28 against which the rod 15 rests when the cable 22 has hauled it into its uppermost position.

In order to hold the mechanism in its inoperative position from swinging each time the steering wheels are moved, I have shown the support plate 5 provided with a recess 29 having a suitable cap 31 screwed therein. In the recess is mounted a spring 32 carrying a spring pressed plate 33. There is provided in the swivel plate 6 a recess 34 in which is mounted a plunger 35 having a head 36 which, in the position of the parts shown in Figure 6, passes through the apertures in the swivel plate 6 and support plate 5, locking the two so that the swivel plate 6 cannot rotate or swivel on the support plate 5. Urging the plunger 35 into its upper position is a spring 37 mounted in a support piece 38. The plunger 35 is provided at its lower end with a head 39 against which the spring 37 bears.

In the position shown in Figure 6, the head 36 of the plunger 35 locks the swivel plate 6 from rotation, and the plunger 35 is held in spring pressed relation between the tension springs 32 and 37. Upon lowering the elevating rod 15 by releasing the cable 22, a contact lug 41, which has been bearing against the head 39, falls with the rod 15 and no longer pushes against the head 39. The head 39 then falls and the springs 32 pushes the head 36 of the plunger 35 to the lower position, so that the head 36 no longer locks the swivel plate 6 from rotation.

Now, let us assume that the rod 15 has again been raised into the position shown in Figure 6, but that the cramp of the wheels prevents the head 36 from entering in the aperture in the plate 5. In such a case no harm is done, because the spring 37 is merely compressed and the head 36 will enter the aperture in the plate 5 when the rod 7 is in a position such as is shown in Figure 2 in the full line position.

This construction permits the device to be held in position to prevent its constant swiveling when not in use, and yet it is free to swivel immediately upon lowering the elevating rod 15. By reason of the fact that the connection between the rod 7 and the tie rod 3 is through springs 25, the normal steering of the vehicle when the parts are in the position shown in Figure 6 can proceed without undue interference. The spring connection between the rod 7 and the rod 3 is also of advantage in view of changes in the angular position of the rod 3 during cramping of the wheels—for instance, such an advantage as is depicted in dotted lines in Figure 2.

In Figure 7 I have shown a modification in which the bearing member 17 is shown mounted in the shaft 14 through a rubber or elastic bushing member 42, comprising a rubber ring 43 and bushings 44 and 45. This construction permits rocking of the elevating rod 15 on the shaft 14 to take care of some of the strains imposed while moving the car either into forward or back position while the wheels are cramped. Means, of course, have been shown in the other forms of device for swivelling the rod 15 so that its plane of rotation on the stub axle 14 coincides substantially with the cramp of the steering wheels. Since there is a slight arcuate motion to the front of the car when the device is used while the steering wheels are cramped, under some conditions of operation I prefer to permit a slight rocking of the elevating rod 15 on the stub axle 14, and the form shown in Figure 7 will take care of this limited motion just described. Under certain conditions of operation, it is not necessary to employ the form of device shown in Figure 7, but it has certain inherent advantages.

In Figure 8, I have shown a modification of the foot member 18 wherein the ground engaging portion is rounded and provided with serrations 46 which may be of any desired configuration.

In Figure 9 is shown a still further modification, in which the ground engaging extremity of the foot member 18 presents an enlarged flat surface, as shown at 47, and is provided with a serrated or roughened surface.

In the form of device shown in Figure 10, I have provided two elevating members similar in construction to those already described. These elevating members are linked by a link piece 48, which links the two rods together. Separate cables are fastened to the foot pieces of the rods 15. These cables may be joined and controlled through a single cable or not, as desired. The members 15, by reason of the link piece 48, must swivel together, but are capable each of separate swinging movement on their respective stub axles.

In the form shown in Figure 11, the construction is similar to that shown in Figure 10, with the exception that there is provided an elongated ground engaging member 49, and the elevating rods 15 are provided at their extremities with balls 51 which fit into socket members 52 carried by the elongated ground engaging member 49. In this form, but one cable 22 is used to raise the members to an inoperative position. Their swivelling movement is provided at the bottom of the elevating rods 15 through the ball and socket connection with the member 49.

While I have shown and described the preferred embodiment of my invention, I wish it to be understood that I do not confine myself to the precise details of construction herein set forth, by way of illustration, as it is apparent that many changes and variations may be made therein, by those skilled in the art, without departing from the spirit of the invention, or exceeding the scope of the appended claims.

I claim:

1. A device to relieve at least part of the weight on the steering wheels of a vehicle comprising a plurality of elevating means, pivots between each means and the vehicle, and means for rotating each pivot to cause the plane of swing of each elevating means to approximately parallel the planes of the steering wheels when they are cramped.

2. A device to relieve at least part of the weight on the steering wheels of a vehicle comprising a plurality of elevating means upon which the vehicle is adapted to be driven by either forward or backward movement thereof, pivots between each means and the vehicle, and means for rotating each pivot to cause the plane of swing of each elevating means to approximately parallel the planes of the steering wheels when they are cramped.

3. A device to relieve at least part of the weight on the steering wheels of a vehicle comprising a plurality of elevating means, pivots between each means and the vehicle, means for rotating each pivot to cause the plane of swing of each elevating means to approximately parallel the planes of the steering wheels when they are cramped, a foot piece, and joints permitting universal movement between the foot piece and each elevating means.

4. A device to relieve at least part of the weight on the steering wheels of a vehicle comprising a plurality of elevating means upon which the vehicle is adapted to be driven by either forward or backward movement thereof, pivots between each means and the vehicle, means for rotating each pivot to cause the plane of swing of each elevating means to approximately parallel the planes of the steering wheels when they are cramped, a foot piece, and joints permitting universal movement between the foot piece and each elevating means.

5. A device to relieve at least part of the weight on the steering wheels of a vehicle comprising a plurality of supporting legs, pivots between each leg and the vehicle and means to rotate each pivot to cause the plane of swing of each leg to approximately parallel the planes of the steering wheels when they are cramped.

6. A device to relieve at least part of the weight on the steering wheels of a vehicle comprising a plurality of supporting legs upon which the vehicle is adapted to be driven by either forward or backward movement thereof, pivots between each leg and the vehicle and means to rotate each pivot to cause the plane of swing of each leg to approximately parallel the planes of the steering wheels when they are cramped.

7. A device to relieve at least part of the weight on the steering wheels of a vehicle comprising a plurality of supporting legs, pivots between each leg and the vehicle, means to rotate each pivot to cause the plane of swing of each leg to approximately parallel the planes of the steering wheels when they are cramped, a foot piece, and joints permitting universal movement between the foot piece and each leg.

8. A device to relieve at least part of the weight on the steering wheels of a vehicle comprising a plurality of supporting legs, pivots between each leg and the vehicle and means to rotate each pivot.

JOHN L. BARR.